(12) United States Patent
Zerwekh et al.

(10) Patent No.: US 7,421,905 B2
(45) Date of Patent: Sep. 9, 2008

(54) OPTICAL SENSOR WITH CO-LOCATED PRESSURE AND TEMPERATURE SENSORS

(75) Inventors: Paul S. Zerwekh, Shawsville, VA (US); Clark D. Boyd, Radford, VA (US); Brooks Childers, Christiansburg, VA (US); Daniel C. Blevins, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 49 days.

(21) Appl. No.: 10/570,049

(22) PCT Filed: Sep. 2, 2004

(86) PCT No.: PCT/US2004/028625

§ 371 (c)(1),
(2), (4) Date: Feb. 28, 2006

(87) PCT Pub. No.: WO2005/024365

PCT Pub. Date: Mar. 17, 2005

(65) Prior Publication Data

US 2007/0006663 A1    Jan. 11, 2007

Related U.S. Application Data

(63) Continuation-in-part of application No. 10/653,996, filed on Sep. 4, 2003, now Pat. No. 7,104,141.

(60) Provisional application No. 60/499,725, filed on Sep. 4, 2003.

(51) Int. Cl.
    *G01L 1/24*    (2006.01)

(52) U.S. Cl. .................................................. 73/800
(58) Field of Classification Search .................. 73/800
    See application file for complete search history.

(56) References Cited

U.S. PATENT DOCUMENTS

| 4,547,668 | A |   | 10/1985 | Tsikos |        |
|-----------|---|---|---------|--------|--------|
| 4,945,230 | A | * | 7/1990  | Saaski et al. | 250/227.21 |
| 5,032,026 | A | * | 7/1991  | Jouve et al.  | 356/478 |

(Continued)

OTHER PUBLICATIONS

PCT International Search Report and Written Opinion of the International Searching Authority, International Application No. PCT/US04/28625, filed Sep. 2, 2004. Report mailed Feb. 15, 2006.

(Continued)

*Primary Examiner*—Mak Noori
(74) *Attorney, Agent, or Firm*—The H.T. Than Law Group

(57) ABSTRACT

An optical sensor (10) that provides for concurrent pressure and temperature measurements at substantially the same location includes at least one launch fiber (22) and at least one temperature sensitive material (52) having a refractive index that changes with a change in temperature. The launch fiber and temperature sensitive material are spaced from each other across a gap (21) having length (L). A reflecting fiber (26) can be provided adjacent the temperature sensitive material. The optical sensor (10) also includes a sealed cavity (20). The launch fiber (22) and reflecting fiber (26) can be attached to the tube and at least partially disposed within the cavity. Changes in pressure change the length (L) of the gap (21).

28 Claims, 13 Drawing Sheets

U.S. PATENT DOCUMENTS

| | | | |
|---|---|---|---|
| 5,087,124 A | 2/1992 | Smith et al. | |
| 5,301,001 A | 4/1994 | Murphy et al. | |
| 5,315,110 A * | 5/1994 | Smith | 250/227.27 |
| 5,345,519 A | 9/1994 | Lu | |
| 5,528,367 A | 6/1996 | Putnam et al. | |
| 5,582,170 A | 12/1996 | Soller | |
| 5,612,778 A | 3/1997 | Hall et al. | |
| 5,682,237 A | 10/1997 | Belk | |
| 5,872,876 A * | 2/1999 | Kluth et al. | 385/12 |
| 5,907,403 A | 5/1999 | Andrews | |
| 5,963,321 A | 10/1999 | Wang | |
| 6,014,215 A | 1/2000 | Kempen et al. | |
| 6,016,702 A * | 1/2000 | Maron | 73/705 |
| 6,056,436 A | 5/2000 | Sirkis et al. | |
| 6,069,686 A * | 5/2000 | Wang et al. | 356/35.5 |
| 6,563,970 B1 | 5/2003 | Bohnert et al. | |
| 6,567,173 B1 | 5/2003 | Johannesen | |
| 6,671,055 B1 * | 12/2003 | Wavering et al. | 356/478 |
| 7,104,141 B2 * | 9/2006 | Zerwekh et al. | 73/800 |
| 7,164,481 B2 * | 1/2007 | Kawasaki et al. | 356/519 |
| 2002/0159671 A1 | 10/2002 | Boyd et al. | |

OTHER PUBLICATIONS

Supplementary European Search Report from the European Patent Office, European Patent Application No. 04783011.2, filed Sep. 2, 2004.

* cited by examiner

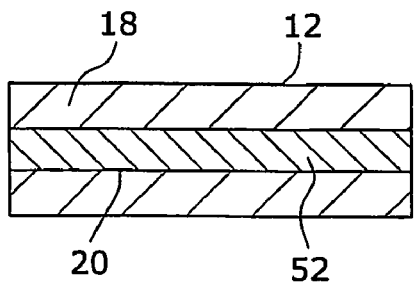
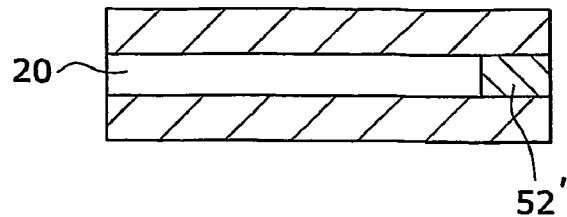
Fig. 4A          Fig. 4B
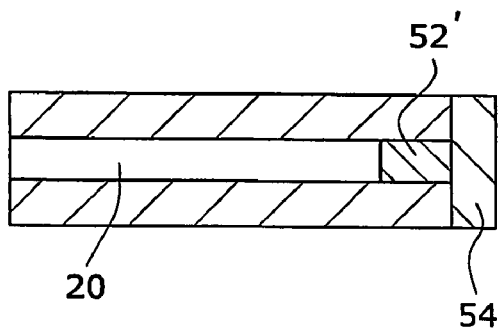
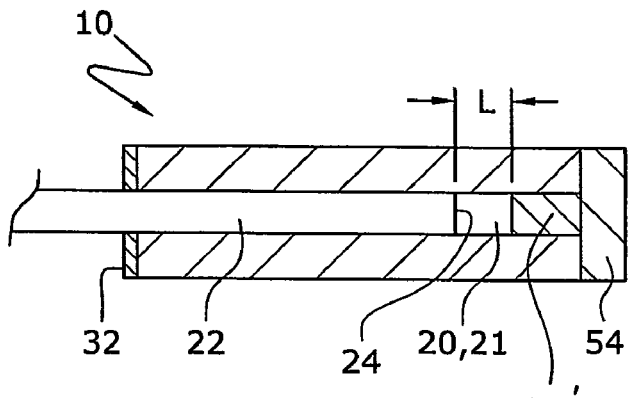
Fig. 4C          Fig. 4D
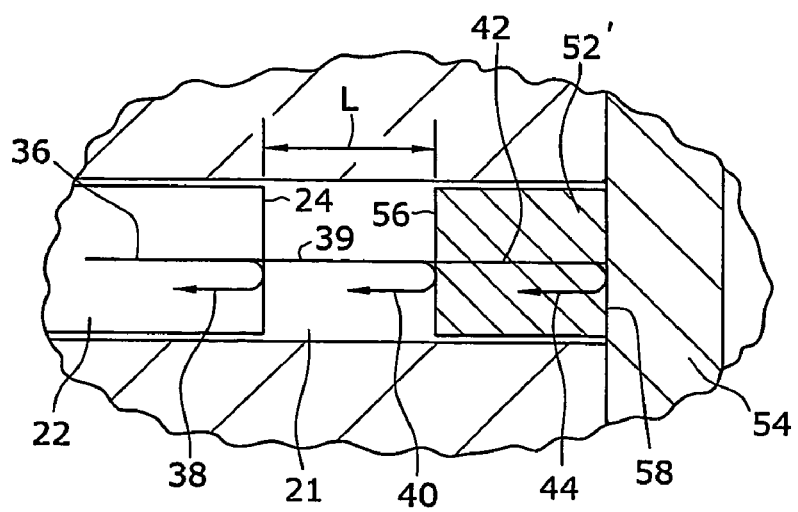
Fig. 5

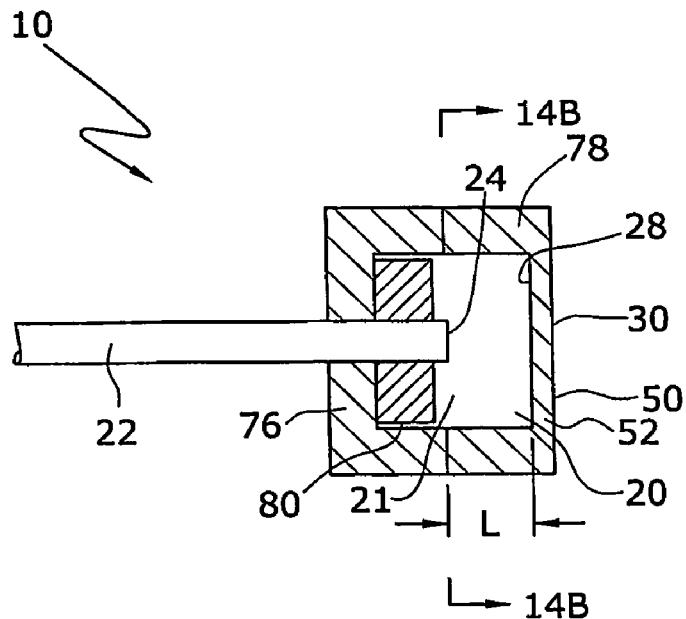
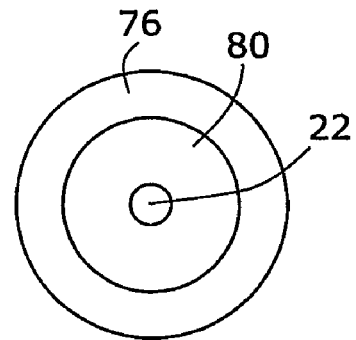
Fig. 14A
Fig. 14B
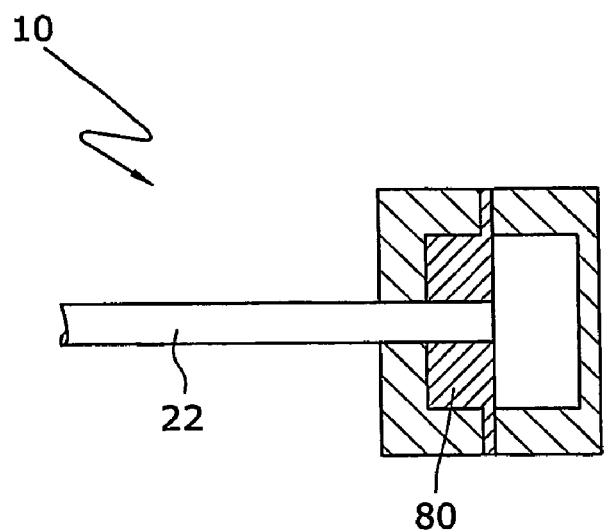
Fig. 14C

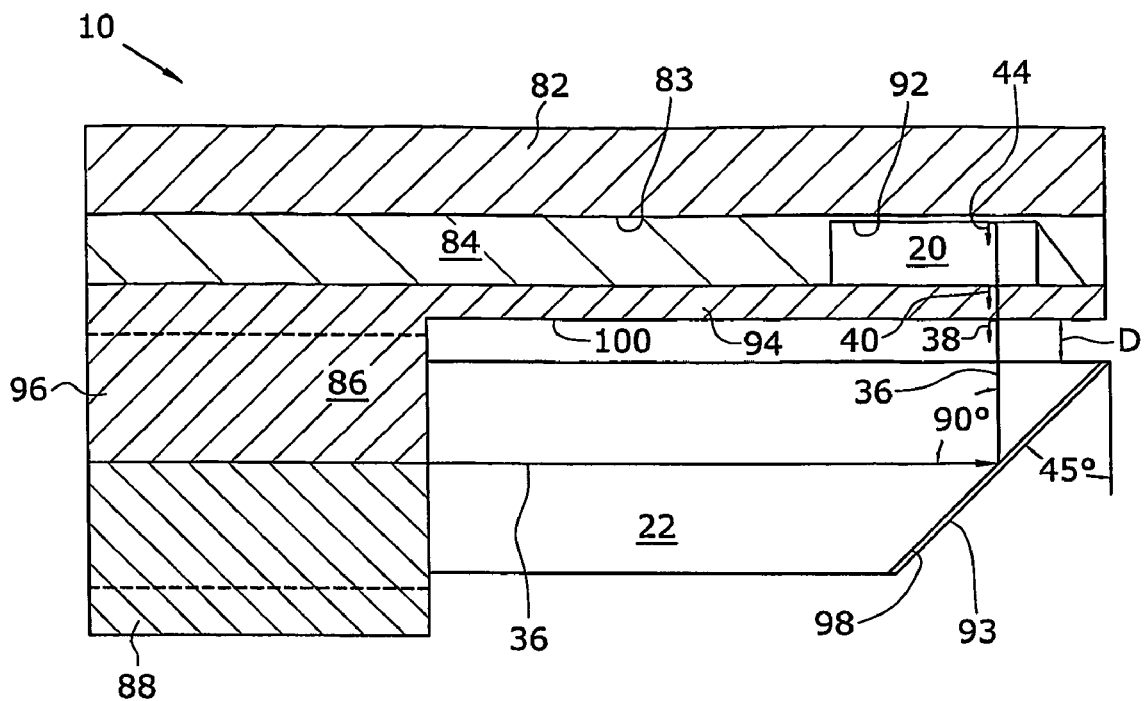
Fig. 15
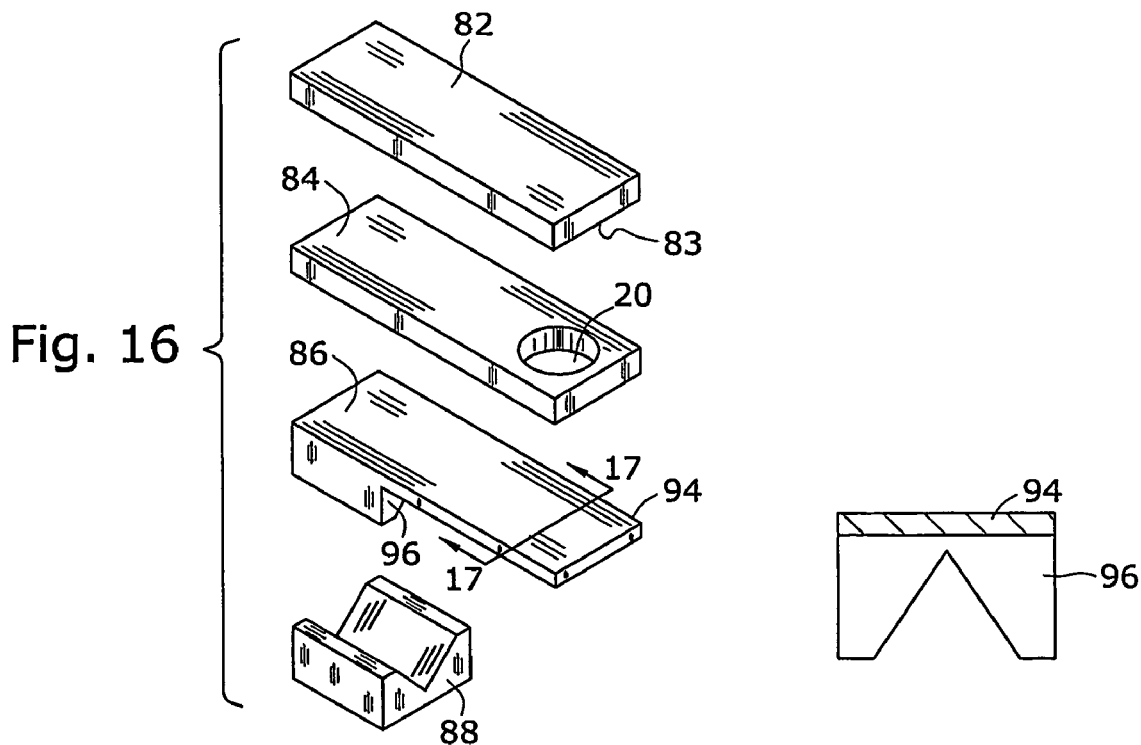
Fig. 16
Fig. 17

OPTICAL SENSOR WITH CO-LOCATED PRESSURE AND TEMPERATURE SENSORS

CROSS-REFERENCE TO RELATED APPLICATIONS

The present application is a continuation-in-part application of co-pending U.S. patent application Ser. No. 10/653,996, filed on Sep. 4, 2003 and of U.S. provisional patent application No. 60/499,725, filed on Sep. 4, 2003. The entire disclosures of these applications are incorporated herein by reference.

FIELD OF THE INVENTION

This present invention relates to optical sensors, and more particularly to fiber optic systems having at least two sensors located proximate to each other.

BACKGROUND OF THE INVENTION

Optical fibers have become a communication medium of choice for carrying information, in particular for long distance communication because of the excellent light transmission characteristics over long distances and the ability to fabricate optical fibers in lengths of many kilometers. The information being communicated includes video, audio or data. The ability to transmit data signals is utilized in applications where the optical fibers are used as sensors. These sensors can be used to detect physical or environmental conditions including pressure, temperature, position, vibration, acoustic waves, chemicals, current, electric field and strain, among other properties. The information obtained can be used in system control and calibration, and is conveyed by polarization, phase, frequency, wavelength and intensity modulation.

Optical sensors can replace conventional sensors, such as resistance gages, thermocouples and electric or electronic gauges, because optical sensors provide immunity to electromagnetic interference and leakage-to-ground problems. Optical sensors also eliminate inaccuracies associated with long, multiple, signal lead requirements, and enjoy compact size, light weight, high sensitivity and large scale multiplexing.

Known optical sensor geometries include Fabry-Perot, Bragg-grating, Mach-Zehnder, Michelson and Sagnac, among others. If all of the sensing occurs within the optical fiber, the optical sensor is an intrinsic fiber; therefore, the fiber acts as both a transmission medium and a sensing element. If the fiber does not act as a sensing element but merely acts as a transmission medium, the optical sensor is classified as an extrinsic sensor. In an extrinsic optical sensor, the optical fiber transmits the light source to an external medium, for example air, where the light is modulated to provide the desired sensing or detection. Optical sensors are also classified by the optical principle which they operate. Interferometric optical sensors utilize interference patterns between source light beams and reflected beams. Intensity based sensors measure the light lost from the optical fiber.

One type of optical sensor is the extrinsic Fabry-Perot interferometer ("EFPI"). An EFPI utilizes two reflective surfaces and the difference or shift between a reference beam and a reflected beam directed through an optical fiber. This phase shift is used to determine or calculate the desired physical or environmental characteristic.

Optical sensors can be used in manufacturing, aerospace applications, civil engineering applications and medical applications. In the petroleum industry, for example, it is important from at least a safety and environmental standpoint to obtain accurate pressure information during, for example, the drilling of an oil well, because the drill bit may drill into a high pressure layer. Optical sensors are lowered into the oil wells during drilling and completion of oil wells to communicate pressure information from various depths within the wells.

Co-locating dual optical sensors have been discussed in the patent literature. For example, both U.S. Pat. Nos. 5,682,237 and 6,671,055 B1 disclose interferometric spectrum from etalons of reflected light portions from co-locating sensors. The disclosures of these references are incorporated herein by reference in their entireties. Such application has not extended into the petroleum industry due to the severe environment encountered downhole. For example, U.S. Pat. No. 6,563,970 B1 discloses an optical sensor for use in an oil and gas well that requires a complex pressure transducer to apply downhole pressure to either elongate or compress a fiber having a Bragg grating thereon.

Additionally, known EFPI sensors used in petroleum drilling only measure one parameter, e.g., either temperature or pressure. However, the temperature within an oil well increases with increasing depth, and optical sensors are susceptible to temperature changes. Failure to account for these temperature changes can lead to inaccurate pressure readings.

Therefore, the need exists for a suitable optical sensor that detects both pressure and temperature in wellbores to provide correction of pressure measurements based upon the measured temperature.

SUMMARY OF THE INVENTION

The present invention is directed to an optical sensor adapted for use in the oil and gas wells that has at least two sensing regions. Each sensing region preferably measures one environmental condition, e.g., pressure, temperature, tilt angle of the well bore, position, vibration, acoustic waves, chemicals, chemical concentrations, current, electric field and strain, among other properties. Preferably, the two or more sensing regions are located proximate to each other so that the measured environmental conditions are at substantially the same depth. Each sensing region may include an intrinsic type sensor or an extrinsic type sensor or both.

The present invention is directed to an optical sensor comprising at least two sensing regions located proximate to each other. One of the sensing regions is a pressure sensing region and comprises a sealed cavity having a first and second reflecting surfaces. The distance between the first and second reflecting surfaces changes in response to a change in pressure, and a first reflected light and a second reflected light from these two reflecting surfaces form an interferometric signal representative of a pressure at the location of the optical sensor.

A launch waveguide is operatively connected to the sealed cavity and projects light into the sealed chamber. The launch waveguide can be connected to the cavity or be spaced apart therefrom. The sealed cavity has various configurations. It can be defined by a hollow tube, the launch waveguide and a distal member, where the tube is sealed to the launch waveguide and the distal member. The distal member can be a reflective waveguide, an end cap or a disk. In other configurations, the sealed cavity can be defined by an end cup sealed to the launch waveguide or by two half-cups sealed to the launch waveguide. The cavity can be sealed by conductive heating, arc welding, laser welding, FRIT glass, solder glass, molecular polishing, epoxy, adhesive or anodic attachment.

The sealed cavity can comprise a gas or can be a partial vacuum. The partial vacuum can be provided by vacuum fixturing process or by gas diffusion process.

The other sensing region of the optical sensor can be a temperature sensing region, which comprises a temperature sensitive material. In one embodiment, the temperature sensing region comprises a third reflecting surface. The second reflected light and a third reflected light from the third reflecting surface form an interferometric signal representative of a temperature at the location of the optical sensor. In another embodiment, the temperature sensing region further comprises a fourth reflecting surface and wherein a third reflected light and a fourth reflected light from the third and fourth reflecting surfaces form an interferometric signal representative of a temperature at the location of the optical sensor. The first and second reflecting surfaces can be connected to the third and fourth reflecting surfaces by a reflective waveguide.

The temperature sensing region can be located within the sealed cavity, can be spaced apart from the sealed cavity, or can form a part of the wall of the cavity.

In one embodiment, the second and third reflecting surfaces define a diaphragm and in response to pressure the diaphragm changes the distance between the first and second reflecting surfaces. In another embodiment, the sealed cavity has a unitary construction and is defined by a tube fused to the launch waveguide and to a capillary tube. Preferably, the tube and the capillary tube are made from materials having similar coefficient of thermal expansion, or from the same material to compensate for the thermal expansion on the distance between the first and second reflecting surfaces. A temperature sensing material can be disposed inside the capillary tube. The capillary tube may comprise a hollow portion to minimize reflected light. Alternatively, the distal end of the capillary tube is modified to minimize reflected light.

In another embodiment, the launch waveguide is spaced apart from the sealed cavity and projects light into the sealed cavity. The distal end of the launch waveguide can be angled so that light propagating through the launch waveguide is directed into the cavity. The sensor can be made from wafers that are polished to a molecular level so that the wafers are bonded to each other. The wafers then can be diced or cut up into individual sensors and attached to launch waveguides.

Light from the launch waveguide can propagate through the temperature sensing region before propagating through the pressure sensing region, and vice versa. One of the first and second reflecting surfaces can be coated with an optical coating. Alternatively, both of the reflecting surfaces are coated with different optical coating.

BRIEF DESCRIPTION OF THE DRAWINGS

In the accompanying drawings, which form a part of the specification and are to be read in conjunction therewith and in which like reference numerals are used to indicate like parts in the various views:

FIGS. 4A-D illustrate the formation of an optical sensor in accordance with another exemplary embodiment of the invention;

FIG. 5 is an enlarged view of the interface between the launch and reflective fibers of the optical sensor of FIG. 4D;

FIGS. 14A-14C are cross-sectional views and cut-away view of another optical sensor;

FIG. 15 is a cross-sectional view of another optical sensor, wherein the launch fiber is mechanically decoupled from the sensing regions;

FIG. 16 is an exploded perspective view of the optical sensor of FIG. 15;

FIG. 17 is a cross-sectional view taken along line 17-17 of FIG. 16.

DETAILED DESCRIPTION

Figure 1:
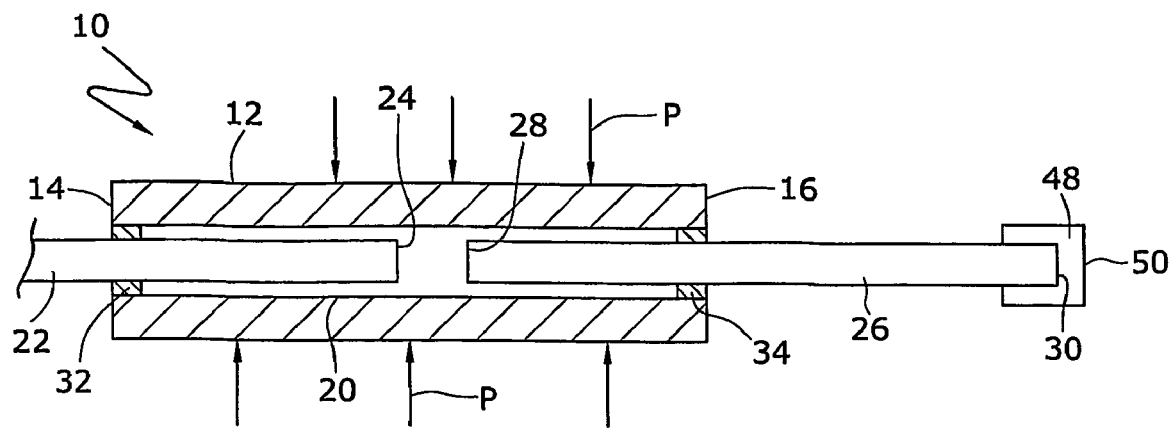
FIG. 1 is a cross-sectional view of an optical sensor constructed in accordance with an exemplary embodiment of the invention.

Referring initially to FIG. 1, an embodiment of optical sensor 10 in accordance with the present invention includes tube 12, which has first end 14 and second end 16 and relatively thick wall 18 extending between the two ends. Tube 10 defines cavity 20 therewithin. At least one input/output or launch waveguide or fiber 22 is inserted into cavity 20 at first end 14 and reflective waveguide or fiber 26 is inserted into cavity 20 at second end 16. The term "waveguide" and "fiber" are used interchangeably herein and include, but are not limited to, any optical fiber, optical waveguide, fiber core, fiber core plus cladding and any optical structure capable of transmitting light. First end 24 of launch fiber 22 is spaced apart from first end 28 of reflective fiber 26 by spatial gap 21 having a length "L". Second end 30 of reflective fiber 26 is attached to cap 48. Cap 48 contains a temperature sensitive material therewithin and has distal end 50. Although cavity 20 and gap 21 illustrate an EFPI and cap 48 illustrates a particular temperature sensor, these sensors are used for illustration purpose only and other types of sensors are usable with the present invention. Hence, the present invention is not limited to any particular type of optical sensor.

Launch fiber 22 is capable of transmitting multiple wavelengths of light along its length in both directions. Suitable materials for launch fiber 22 include a single mode fiber, a multimode fiber, a polarization maintaining fiber or a plastic fiber, among others. The length of launch fiber 22 is selected based upon the particular application and the distance to the depth being measured, e.g., the distance down an oil or gas well. Fiber 22 can have any diameter suitable for the particular application. In one non-limiting example, the diameter can be from about 60 μm to about 250 μm, and preferably it is about 125 μm.

Suitable materials for reflecting fiber 26 include a coreless fiber, a single mode fiber, a multimode fiber, a polarization maintaining fiber and a plastic fiber. Preferably, the length of reflective fiber 26 is relatively short, so that the temperature sensor or cap 48 attached to second end 30 of reflective fiber 26 is located proximate to the pressure sensor located in tube 12. Fiber 26 may have the same diameter as fiber 22 or different diameter.

First end 24 of launch fiber 22 and/or first end 28 of reflective fiber 26 can be modified to simulate or provide additional optics or optical effects. For example, first ends 24 and 28 can be modified to form or function as one or more lenses, providing a wider range of useful gaps 21. In addition, optical coatings 23 and 27 can be applied to launch fiber first end 24 and reflective fiber first end 28, respectively. Optical coatings 23 and 27 enhance the spectral characteristics so that demodulation of the gap information may be more accurately and more easily accomplished. Optical coatings can be used to increase the finesse of cavity 21, i.e., changing the shape or curves of a particular reflected light portion to distinguish it from the other reflected light portions, and to allow wavelength division multiplexing. Suitable materials for the optical coatings include, but are not limited to, magnesium fluoride, metal oxides (such as silicon monoxide, zirconium oxide, tantalum oxide, niobium oxide, silicon carbide, aluminum oxide, etc.), silicon, gold, aluminum, titanium, nickel, chromium and combinations thereof. Optical coatings 23 and 27 can be made from the same material, and preferably from different materials.

To control length "L" of gap 21, launch fiber 22 can be attached to tube 12 at first end 14 by one or more first bonds 32. Similarly, reflective fiber 26 can be attached to tube 12 at second end 16 by one or more second bonds 34. Suitable methods for forming the first and second bonds 32 and 34 include conductive heating, arc welding, laser welding, or through FRIT glass or solder glass. Alternatively, the bonds can be molecular, epoxy, adhesive or anodic attachment mechanisms. Launch fiber 22 and reflective fiber 26 can extend into cavity 20 and at least a portion of launch fiber 22 and a portion of reflective fiber 26 are disposed within cavity 20. Length "L" of gap 21 can be defined as the distance between launch fiber 22 and reflective fiber 26 within cavity 20 or as the distance between the two first ends 24 and 28.

Figure 2:
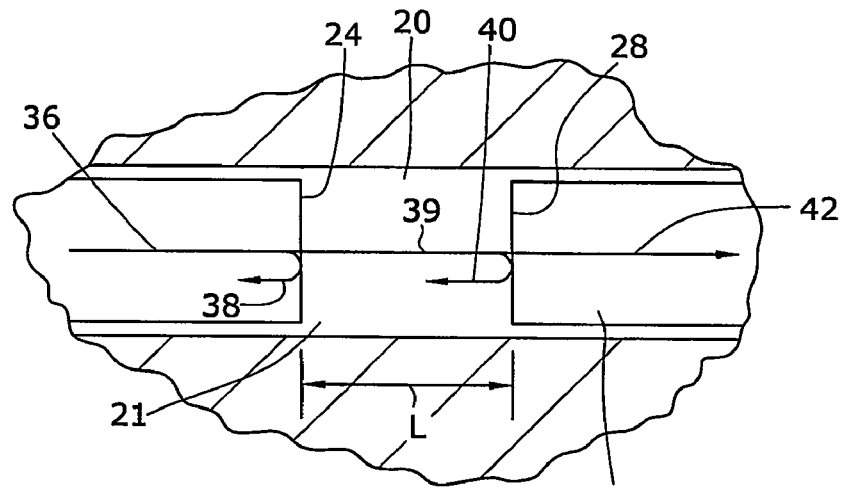
FIG. 2 is an enlarged view of the interface between the launch and reflective fibers of the optical sensor of FIG. 1.

Referring to FIG. 2, light from a light source located on the surface near the wellhead propagates through launch fiber 22, and exits first end 24 and enters gap 21 of cavity 20. Light includes any wavelength in the electromagnetic spectrum, including but not limited to broadband, lasers, visible light, non-visible light. Initial light portion 36 is transmitted through launch fiber 22. As initial light portion 36 contacts the interface at first end 24 between launch fiber 22 and gap 21, a portion, for example approximately four percent, of initial light portion 36 is reflected back down launch fiber 22 as first reflected light portion 38. First reflected light 38 has the same properties as initial light 36 and is essentially the reference light. The percentage of reflected light is a function of material properties and dimensions, and the actual reflected percentage changes accordingly. First remaining light portion 39 propagates through gap 21. At the interface at first end 28 between gap 21 and reflecting fiber 26, another portion, for example approximately four percent, is reflected back as second reflected light portion 40. Second remaining light portion 42 propagates through reflective fiber 26.

Figure 3:
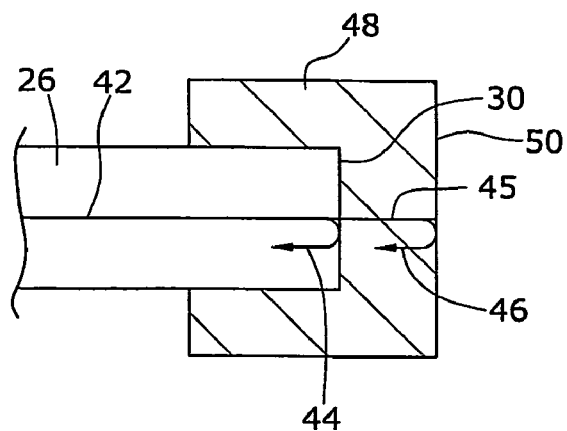
FIG. 3 is an enlarged view of an end of the reflective fiber of the optical sensor of FIG. 1.

Referring to FIG. 3, second remaining light portion 42 propagates down reflecting fiber 26 toward second end 30. At the interface at second end 30 between reflective fiber 26 and temperature sensitive cap 48, another portion, for example approximately sixteen percent, is reflected back along reflective fiber 26 as third reflected light portion 44. Third remaining light 45 travels through cap 48. At distal surface 50 of cap 48, another portion, for example approximately sixteen percent of light, is reflected back as fourth reflected light portion 46. The temperature sensitive material can also have a metallic layer (not shown) disposed adjacent cap 48.

The reflected light portions 38, 40, 44 and 46 produce an interferometric signal, which can be processed to yield the measured properties, e.g., pressure and temperature, discussed in details below. An example of such interferometric signal is disclosed in U.S. Pat. No. 6,671,055 B1. The '055 patent is incorporated herein by reference in its entirety. Furthermore, as discussed above it is noted that percentage of reflected light is determined by the ratio of the index of refraction of the temperature sensitive material to the index of refraction of the surrounding medium. Hence the exemplary percentages of reflected light portions provided above are for illustration purpose only.

As optical sensor 10 descends into a well, pressure "P" (shown in FIG. 1) is uniformly exerted along the entire exterior of tube 12. As pressure "P" increases, the exterior is pushed inwardly, changing gap 21 of cavity 20. In particular, the pressure increases (with increasing depth from the surface) length "L" of gap 21 decreases. This change in length "L" is used to calculate the pressure at any point within the well. In one embodiment, length "L" of spatial gap 21 is pre-determined to correspond to a pre-determined pressure. Specifically, the initial length of gap 21 is chosen so that interferometric measurement of the optical displacement between the launch fiber first end 24 and a reflective surface corresponds to a known pressure, such as, for example, standard pressure of 14.7 pounds per square inch (psi). Gap 21 can be a partial-vacuum, and may contain an inert gas or air. The residual gas can be removed by vacuum fixturing, gas diffusion process or other known techniques. In the gas diffusion process, cavity 20 is filled with helium (He) and as helium diffuses from the cavity a partial vacuum is formed within gap 21. In vacuum fixturing, cavity 20 is in fluid communication with a capillary tube, and the gas in cavity 20 can be withdrawn through the tube and the tube is sealed or pinched to maintain the partial vacuum in the cavity.

As was discussed previously, end cap 48 is formed of a material 52 that exhibits a changing refractive index with changing temperature. Thus, as optical sensor 10 descends from the surface, the refractive index of cap 48 changes with the increasing temperature, thus altering the optical displacement between second end 30 and distal cap surface 50 as shown in FIG. 3. The difference in the optical displacements at the earth's surface and at some depth below the surface is equated with a temperature at that depth. Knowing the temperature at a given depth allows for the correction of the pressure calculations to more accurately portray the pressure at that same depth and for the correction of thermal apparent error. Alternatively, the temperature sensitive material can be viewed as a filter having a wavelength that changes with temperature.

Temperature sensitive material 52 in cap 48 can be constructed from any material, or combination of materials, that exhibits a changing optical path resulting from changing index of refraction and/or coefficient of thermal expansion with changing temperature. In other words, as the index of refraction changes the speed of light through the medium also changes resulting in a phase change. This phase change causes a change in the interference of the reflected light at the temperature material with the reflected light at the pressure gap, which is the readable interferometric result. As used herein, with respect to temperature sensitive materials, the optical displacement of a material refers to the effect of the index of refraction of that material on the speed of light propagating through the material. Suitable temperature sensitive materials include, but are not limited to, silicon, sapphire, silicon carbide (SiC), tantalum oxide ($Ta_2O_5$) and others, such as metal oxides. Such temperature measurement is disclosed in, J. Sotomayor and G. Beheim, "Laser-Annealed Fabry-Perot Fiber-Optic Temperature Sensor" published in SPIE Vol. 2070-Fiber Optic and Laser Sensors XI (1993). The disclosure of this reference is incorporated herein in its entirety.

Hence, in the embodiment of FIGS. 1-3, one sensing region includes the pressure measurement resulting from first reflected light 38 and second reflected light 40, i.e., gap 21, and the other sensing region includes the temperature measurement resulting from third reflected light 44 and fourth reflected light 46, i.e., end cap 48.

In accordance with one aspect of the present invention, at least one of launch fiber 22, reflecting fiber 26, tube 12, cap 48 and other components comprises a coating arranged to shield the fiber or tube from moisture or other contaminant to improve stability and reliability. Suitable coatings include xylylene (available as Parylene®), carbon, titanium oxide and combinations thereof.

Sensor 10 can be manufactured by many techniques and have other configurations. Another exemplary, non-limiting technique is illustrated in FIGS. 4A-4D and 5. Tube 12 with wall 18 and cavity 20 can be constructed from any material that deforms when exposed to increasing pressure, preferably within the pressure range that sensor 10 operates. Suitable materials for tube 12 include metal, polymer, sapphire, alumina, and combinations thereof. Tube 12 can be extruded, drawn or pierced. Although cavity 20 can be arranged to have any shape desired, cavity 20 is generally cylindrical in shape, and tube 12 may contain more than one cavity 20. Cavity 20 should have an inner diameter that can accommodate both launch fiber 22 and reflective 26. Temperature sensitive material 52 is inserted into cavity 20, as illustrated in FIG. 4A. The temperature sensitive material is etched down to a remaining portion 52', as illustrated in FIG. 4B. When temperature sensitive material 52 is silicon, potassium hydroxide (KOH) can be used as the etching medium.

Disk 54 is then attached to tube 12 and is flushed with remaining temperature sensitive material 52', as illustrated in FIG. 4C. Disk 54 can be attached by any means, such as, laser welding or solder glass. Disk 54 can be made from a similar material as tube 12. Thereafter, launch fiber 22 is inserted into cavity 20 until first end 24 of launch fiber 22 is spaced apart at length "L" in spatial gap 21 from remaining temperature sensitive material 52', as illustrated in FIG. 4D. Launch fiber 22 can be attached to tube 22 by bond 32 or 34. Hence, the embodiment of sensor 10 shown in FIGS. 4A-4D differs from the embodiment shown in FIGS. 1 in that the temperature sensitive material is protected inside tube 12 and that reflective fiber 26 is also omitted. Launch fiber 22 may include optical coating 23, and temperature sensitive material 52, 52' may include an optical coating 27.

The optical path of the embodiment of FIGS. 4A-4D is shown in FIG. 5. Initial light portion 36 propagates along launch fiber 22 and is partially reflected at first end 24 of fiber 22. First reflected light 38 is reflected back in the opposite direction along launch fiber 22. First remaining light portion 39 propagates through spatial gap 21 and is partially reflected at first end 56 of temperature sensitive portion 52'. Second reflected light 40 is reflected back through gap 21. Second remaining light 42 propagates through temperature sensitive portion 52' and is partially reflected at second end 58 as third reflected light portion 44. Again, the reflected light portions produce an interferometric signal, which can be interpreted to yield the measured properties, e.g., pressure and temperature, discussed in details below.

Hence, in the embodiment of FIGS. 4A-4D and 5, the first sensing region includes the pressure measurement resulting from first reflected light 38 and second reflected light 40 and the other sensing region includes the temperature measurement resulting from second reflected light 40 and third reflected light 44.

Figure 6A:
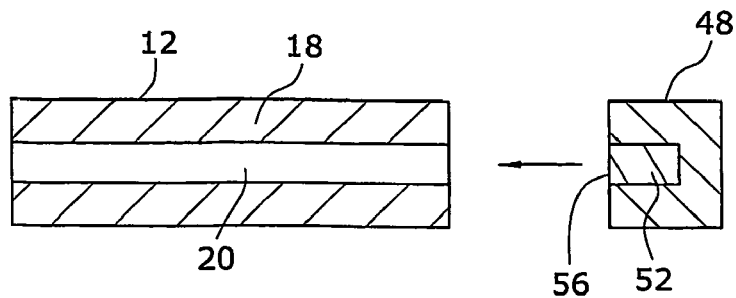
FIGS. 6A-B illustrate another optical sensor of the present invention.
Figure 6B:
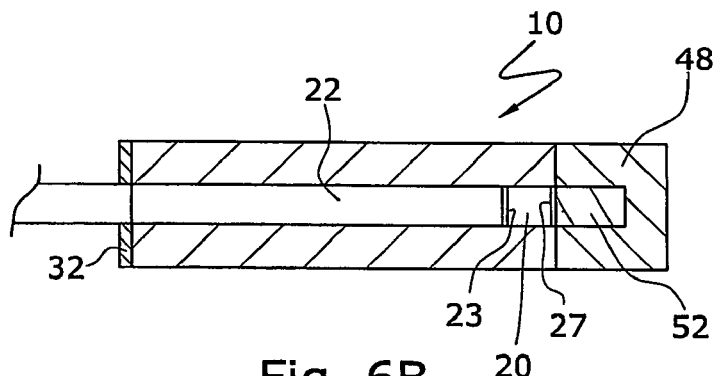

Another embodiment of sensor 10 is shown in FIGS. 6A-6B. Optical sensor 10 includes cap 48 that is separate from and independent of tube 12. Cap 48 has a cavity that contains temperature sensitive material 52. Temperature sensitive material 52 is lapped down flat so that leading first end 56 is generally flat and aligned with cap 48's edge. Cap 48 is bonded to tube 12 so that temperature sensitive material 52 is exposed to tube cavity 20. Suitable methods for bonding cap 48 to tube 12 are the same as those for attaching disk 54 to tube 12. In this embodiment, launch fiber 22 is inserted into the cavity 20 in a similar manner as the embodiment of FIGS. 4A-4D to create gap 21 and is secured and bonded in that position by bond 32 or 34. The optical path of the embodiment of FIGS. 6A-6B is substantially similar to that of the embodiment of FIGS. 4A-4B.

Figure 7:
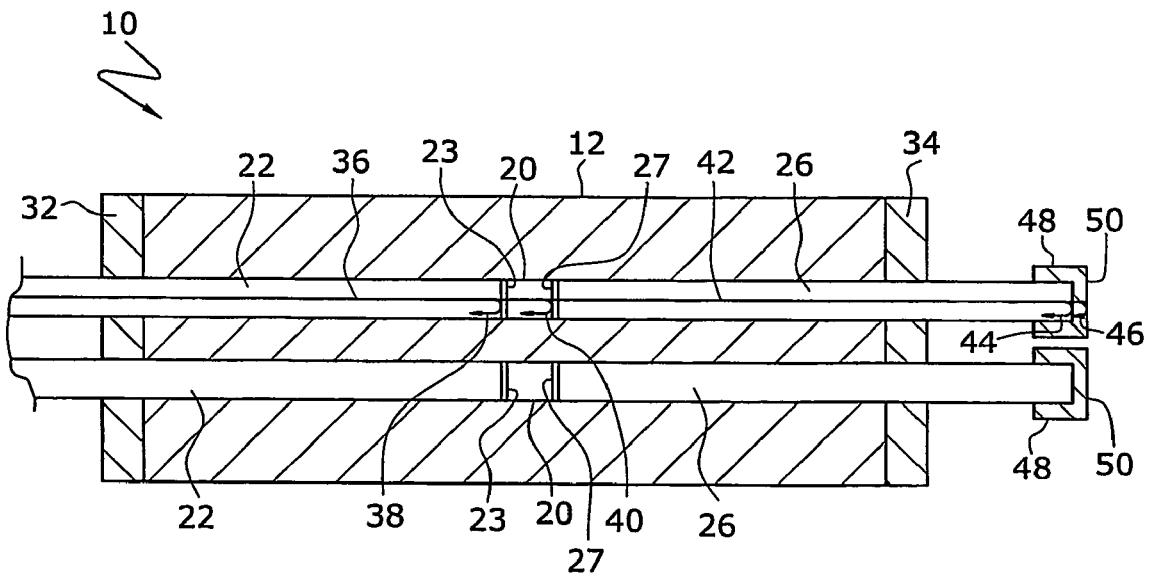
FIG. 7 is a cross-sectional view of another optical sensor of the present invention showing dual cavities.

Although illustrated above in FIG. 1 with a single set of gap 21, launch fiber 22, temperature sensitive material 52 and reflecting fiber 26, sensor 10 can include two or more sets of launch fibers, gaps, temperature sensitive materials and reflecting fibers. Referring to FIG. 7, optical sensor 10 includes two launch fibers 22 fixedly secured within two spaced apart cavities 20 of tube 12. Alternatively, launch fibers 22 can be disposed within a single cavity 20. Two reflecting fibers 26 can be securely attached to tube 12 creating a pair of gaps 21. Launch fibers 22, reflective fibers 26 and gaps 21 can be identical to provide redundancy or can be different to provide for comparative measurements. For example, optical sensor 10 can be formed with two pressure gaps of different initial lengths and two temperature sensitive materials of different optical lengths (or of different materials). The lengths differ by a pre-determined ratio. By forming the optical sensor 10 in this manner, additional information can be obtained from the sensor. Reflective caps 48 are provided at each second end 30 of reflecting fibers 26 and can be constructed from the same temperature sensitive material 52 or different temperature sensitive materials 52.

Figure 8A:
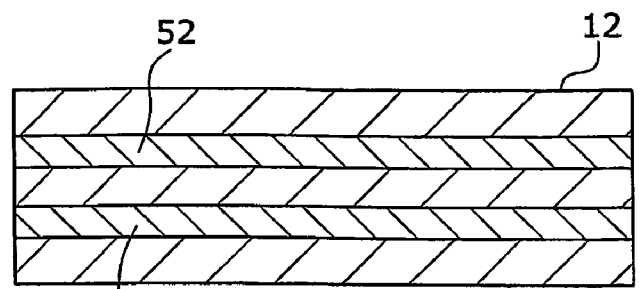
FIGS. 8A-D illustrate the formation of another dual cavity optical sensor of the present invention.
Figure 8B:
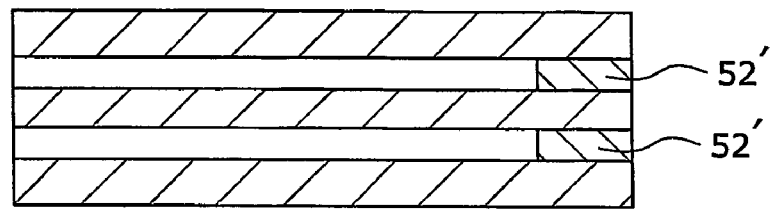
Figure 8C:
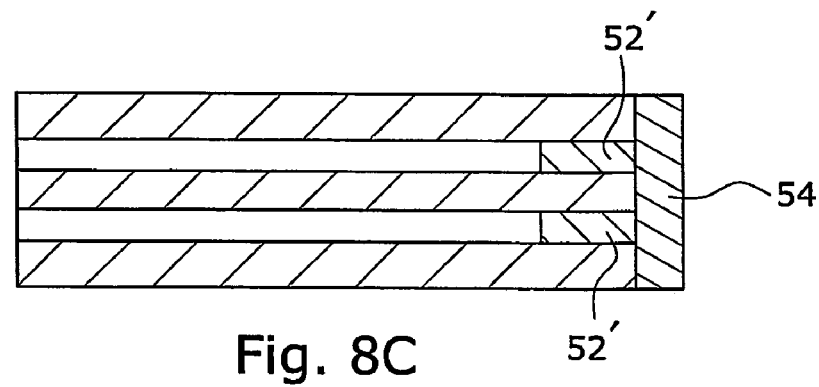
Figure 8D:
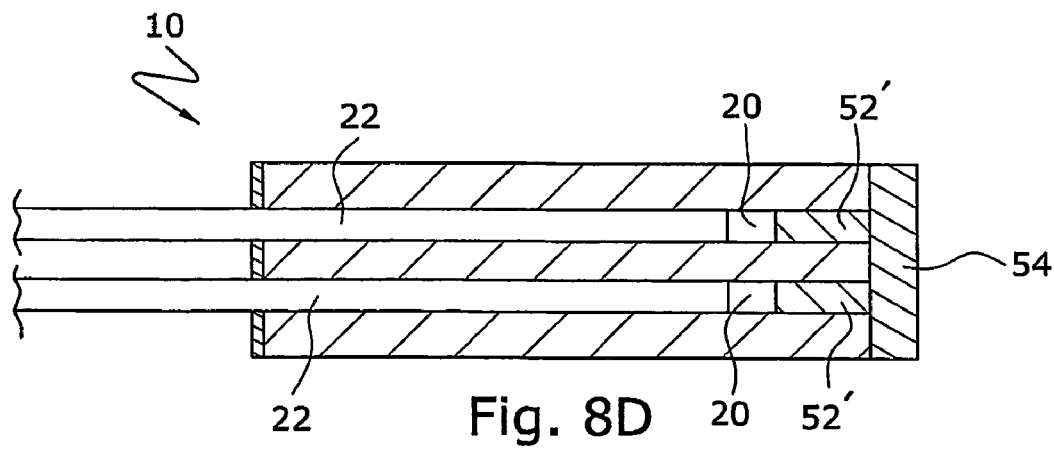

Another embodiment of sensor 10 utilizing two or more sets of sensing regions is illustrated in FIGS. 8A-D. This embodiment is similar to the single cavity embodiment of FIGS. 4A-4B, except that tube 20 has two cavities 20. Each cavity 20 of tube 12 is filled with temperature sensitive material 52, and temperature sensitive material is etched down as was done with the single cavity embodiment. Disks 54 are bonded to tube 12 at the end where the temperature sensitive materials 52' are located (FIG. 8C). Then, launch fibers 22 are inserted into cavities 20 and bonded into place. As was described above, temperature sensitive materials 52 and lengths "L" of gaps 21 can be the same or different.

Figure 9:
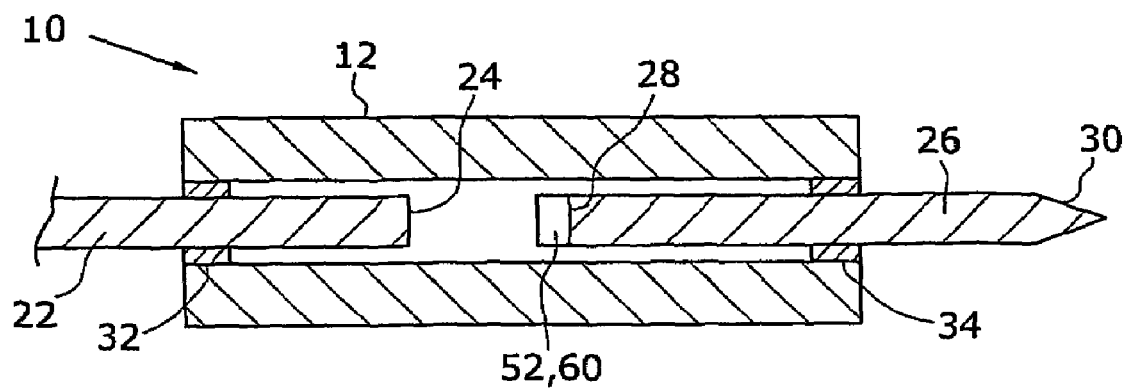
FIG. 9 is a cross-sectional view of another optical sensor.

FIG. 9 illustrates another embodiment of sensor 10. In this embodiment, temperature sensitive material 52 is disposed in cavity 20 and at first end 28 of reflecting fiber 26, and can be arranged as chip 60. Suitable materials for chip 60 include silicon and the other temperature sensitive materials discussed above. In addition in this embodiment, second end 30 of reflecting fiber 26 can be modified, such as bent, tapered, angled, crushed or polished, to reduce or to minimize any additional, unwanted reflections from the far end of reflecting fiber 26 that may increase errors in the demodulation calculations. The optical path of this embodiment is similar to that of the embodiment of FIGS. 4A-4D and 5, i.e., based on three reflected light portions. Alternatively, sensor 10 of this embodiment can be made from a metal such as titanium (Ti). More particularly, tube 12 and member 26 are made from a metal and are welded together at joint 34, and launch waveguide 22 can be encased or protected by a metal sheath, which can be welded to metal tube 12 at joint 32. A metal construction can advantageously higher pressure.

Figure 10:
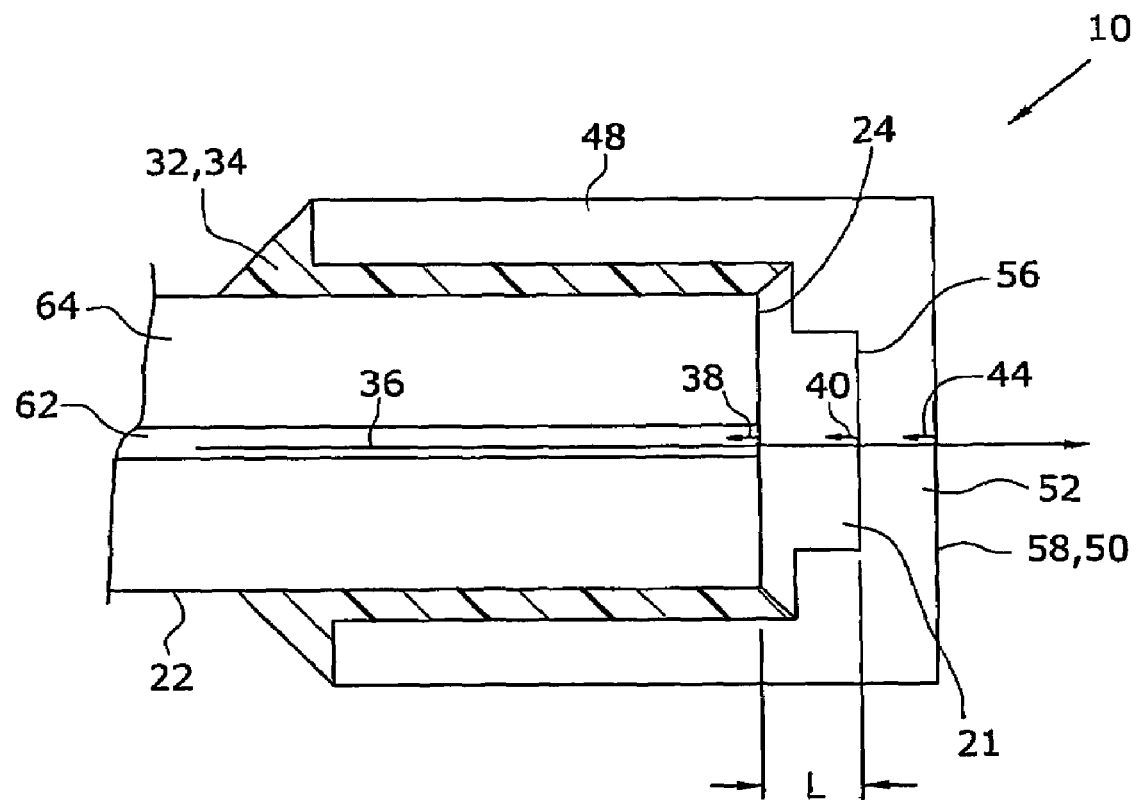
FIG. 10 is a cross-sectional view of another optical sensor.

In another embodiment of optical sensor 10 illustrated in FIG. 10, cap 48 is attached directly to launch fiber 22 and is constructed from temperature sensitive material 52, preferably silicon. Launch fiber 22 can be attached to cap 48 by bond 32 or 34, or by using molecular, epoxy, or anodic attachment mechanisms. Launch fiber 22 can include core 62 surrounded by cladding 64. Cap 48 is configured such that gap 21 is formed between first end 24 of launch fiber 22 and leading or first edge 56 of temperature sensitive material 52. Length "L" of gap 21 is the same as other embodiments. In addition, the thickness of cap 48 between first end 56 and second end 58 (which in this embodiment is the same as distal cap surface 50) of temperature sensitive material 52 is selected so that the end of cap 48 acts like a pressure sensitive diaphragm configured to flex due to the pressure acting upon distal cap surface 50 for the pressure ranges in which optical sensor 10 is deployed. Flexing of this diaphragm causes a change in length "L" of gap 21.

In the embodiment of FIG. 10, initial light portion 36 is transmitted down core 62, and first reflected light portion 38 is reflected back through core 62 at first end 24 of launch fiber 22. Similarly, second reflected light portion 40 is reflected at first end 56 of temperature sensitive material 52 back through core 62. Length "L" is known at standard pressure, and external pressure applied to distal cap surface 50 flexes the pressure sensitive diaphragm and changes length "L" of gap 21, resulting in a change in the interference pattern between first reflected beam 38 and second reflected beam 40. This change in interference pattern is used to calculate the external pressure applied to cap surface 50.

In addition, third reflected light portion 44 is reflected at second end 58 of temperature sensitive material 52 (or distal cap surface 50) back through core 62. The amount of time that it takes for light to pass through temperature sensitive material 52 changes with the refractive index of the material, which changes with temperature. Therefore, as the temperature in which optical sensor 10 is located changes, the interference pattern between third reflected light portion 44 and either first reflected light portion 38 or second reflected light portion 40 changes. This change is used to calculate the ambient temperature.

The optical path of this embodiment is similar to that of the embodiment of FIGS. 4A-4B, except that a single sensing element, the pressure sensitive diaphragm at distal end 50 of cap 48, measures both the pressure and temperature.

Figure 11:
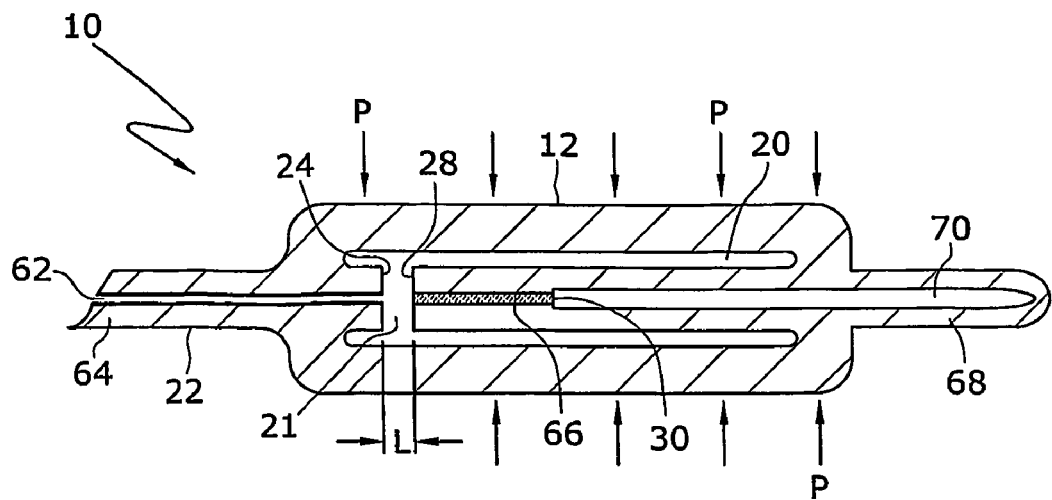
FIG. 11 is a cross-sectional view of another optical sensor.

In another embodiment illustrated in FIG. 11, optical sensor 10 is constructed without using bond 32 or 34. Optical sensor 10 has a unitary construction and comprises launch fiber 22, gap 21 having length "L", and a length of temperature sensitive waveguide or fiber 66 disposed inside capillary tube 68. Launch fiber 22 has core 62 and cladding 64. Both cladding 64 of launch fiber 22 and capillary tube 68 are fused to tube 12 to provide the unitary construction. Similar to the embodiment of FIGS. 1-3, tube 12 defines cavity 20 and both launch fiber 22 and capillary tube 68 partially extend into cavity 20. Preferably, capillary tube 68 extends into cavity 20 along most of the length of cavity 20, as shown, and both tube 12 and capillary tube 68 are made from the same material. When both tube 12 and capillary tube 68 are made from the same material and have the same coefficient of thermal expansion, tube 12 and capillary tube 68 thermally expand at substantially the same amount, thereby minimizes the effect caused by differential thermal expansion on the changes of length "L" of gap 21. Hence, changes in length "L" would be caused primarily by changes in pressure. Preferably, tube 12 and capillary tube 68 are made from fused silica. Preferably, fiber 66 is made from a fused silica based fiber which has sufficiently high dN/dT (change in index of refraction/change in temperature) for temperature sensing.

Similar to the other embodiments of the present invention, initial light 36 propagates along core 62 of launch fiber 22 and at first end 24, first reflected light portion 38 propagates back along core 62. Across gap 21, second reflected light portion 40 is reflected back at first end surface 28 of waveguide 66. The transition from solid waveguide 66 to hollow portion 70 of capillary tube 68 provides reflective surface 30 for third reflected light 44 to reflect back. Hollow portion 70 absorbs the remaining light to minimize additional unwanted reflection and the distal end of capillary tube 68 is bent, tapered, angled or otherwise modified to absorb additional light. As discussed before, reflected light portions 38 and 40 produce interferometric signals to provide pressure measurements, and reflected light portions 40 and 44 produce interferometric signals to provide temperature measurements.

In the embodiment of FIG. 11, an intrinsic Fabry Perot interferometer or IFPI (temperature sensitive waveguide or fiber 66 disposed inside capillary tube 68) is incorporated to an EFPI (gap 21) to form a co-located dual sensor. This embodiment allows the IFPI to be sufficiently short for non-aliased interrogation, allows non-adhesive attachment of the temperature sensor to the pressure sensor and retains the pressure insensitivity of the sensor. Depending on the laser system used, the IFPI can be less than about 5 mm.

Figure 12:
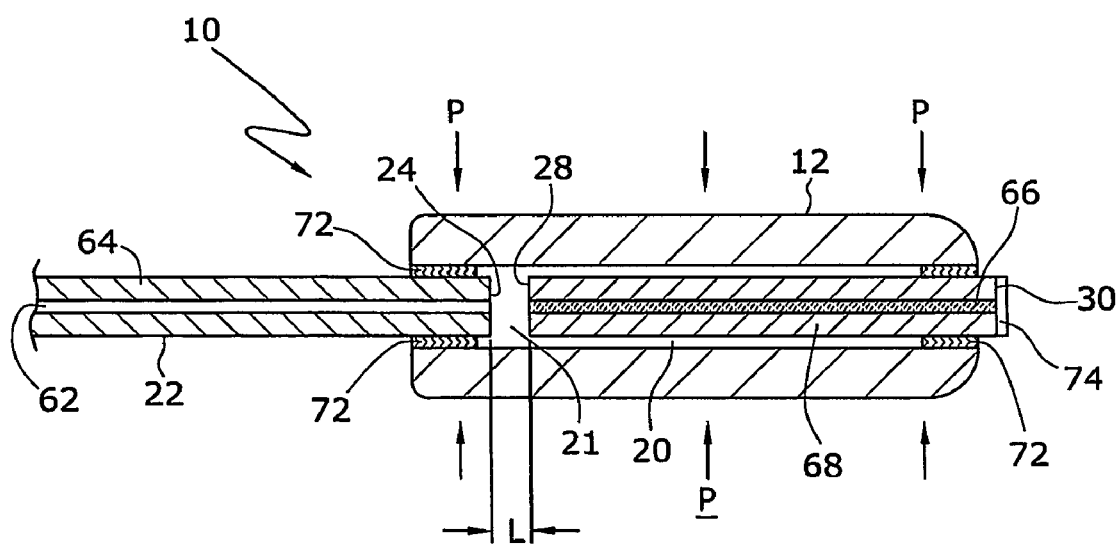
FIG. 12 is a cross-sectional view of another optical sensor.

FIG. 12 illustrates another sensor 10, which is a variation of the embodiment of FIG. 11. In this embodiment, sensor 10 also comprises an IFPI temperature sensor incorporated to an EFPI pressure sensor. Tube 12 is fusion bonded to cladding 64 of launch fiber 22 and to capillary tube 68 at fusion joints 72. Similar to the embodiment of FIG. 11, this sensor has a unitary construction since tube 12 is fused to launch fiber 22 and capillary tube 68, and instead of employing hollow section 70 to reduce further reflection after second reflective surface 30, in the embodiment of FIG. 12 capillary tube 68 cleaved, polished or coated with a metal, e.g., gold (Au) at end 74 after second reflective surface 30 to minimize additional reflection. Additionally, since hollow section 70 is not used more temperature sensitive fiber 66 can be used. Sensor 10 of this embodiment can also be made from metal similar to sensor 10 of the embodiment of FIG. 9, discussed above.

Figure 13:
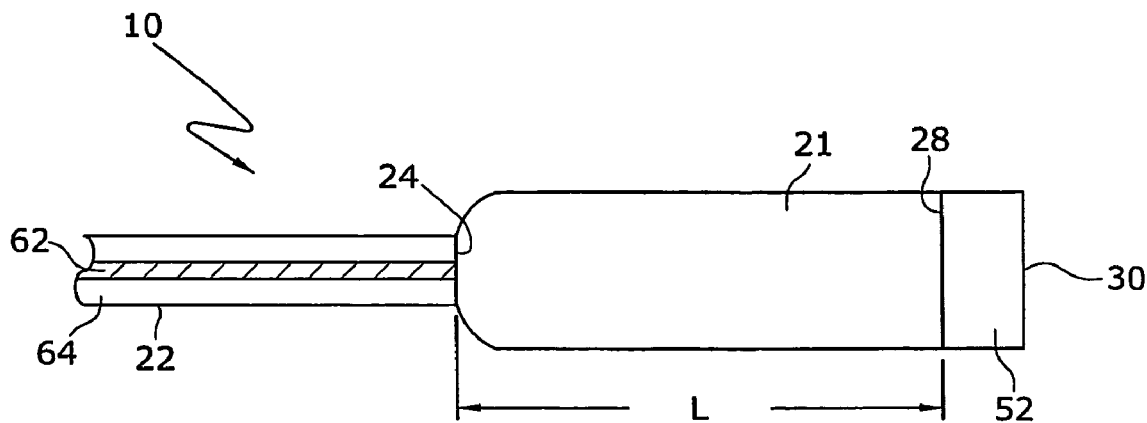
FIG. 13 is a cross-sectional view of another optical sensor.

Another embodiment of sensor 10 is illustrated in FIG. 13. In this embodiment, the first sensing region comprises gap 21, which is preferably made from a solid light transmitting material, and the second sensing region comprises temperature sensitive material 52. Unlike the other embodiments gap 21 is solid and is not filled with gas or not a partial vacuum. Preferably, gap 21 is made from a borosilicate glass, which has a low coefficient of thermal expansion (CTE) to minimize the effect of temperature the pressure measurement. Borosilicate glass can be attached to launch fiber 22 by fusion bonding or fusion splicing. Borosilicate glass is resistant to chemical attack and the low CTE allows the pressure sensing region to be made thick. As such, this material is suitable for deployment in an oil or gas well. Borosilicate glass is commercially available from Corning Glassware, Inc., as Pyrex Brand 7740 Glass. Other glass having similar properties can also be used. The temperature sensing region can be made from any of the temperature sensitive materials 52 discussed above, but preferably is made from silicon. The temperature sensitive material 52 can be attached to the pressure sensing region by any of the bonds 32 or 34 discussed above, but preferably by anodic bonding. At least one of the launch fiber, pressure sensing region or temperature sensing region can be coated with one or more of the coatings discussed above.

Preferably, gap 21 can have the same diameter as launch fiber 21 or larger. Length "L" can be adjusted to provide suitable changes in length due to pressure for a particular application. Light propagating down core 62 would provide reflected light portions 38, 40 and 44 at surfaces 24, 28 and 30, respectively.

Another embodiment of sensor 10 is illustrated in FIG. 14A-14C. This embodiment is similar to the embodiment of FIG. 10 with a pressure sensitive diaphragm. In this embodiment, sensor 10 comprises two half-cups 76 and 78 made from temperature sensitive material 52 and preferably silicon. First half-cup 76 defines a hole sized and dimensioned to receive launch fiber 22. First half-cup 76 also has an internal cavity adapted to receive washer 80. Washer 80 preferably is made from a doped glass (silica) and also has a hole to receive launch fiber 22. Washer 80 assists in the bonding of launch fiber 22 to first half cup 76.

To assemble the sensor, launch fiber 22 is inserted through first half-cup 76 and washer 80, and the assembly is heated in an inert gas atmosphere to the softening point of washer 80. The assembly is then cooled below this softening point and an electrical charge is applied to anodically bond washer 80 to half-cup 76 and to launch fiber 22. Second half-cup 78 can be bonded to first half cup 76 by bond 32, 34. Alternatively, as shown in FIG. 14C washer 80 can have the same diameter as half cups 76 and 78, so that the two half-cups can be anodically bonded to each other. Launch fiber 22 may terminate flushed with washer 80 or can protrude beyond washer (as shown) or may terminate within washer 80.

In this embodiment, the pressure sensing region comprises gap 21 having length "L" and the temperature sensing region comprises temperature sensitive material 52 of second half-cup 78, similar to the other embodiments. Distal end 50 of second half-cup 78 acts as a diaphragm and the diaphragm responses to pressure applied on distal end 50. Applied pressure reduces length "L", which can be processed to measure the pressure, and the change of index of refraction in second half-cup 78 can be process to measure temperature, as discussed above.

Referring to FIGS. 15-17, another optical sensor 10 of the present invention is shown. In this embodiment, sensor 10 comprises both pressure and temperature sensing regions. However, in this embodiment, the temperature sensing region is upstream of the pressure sensing region and both regions are spaced apart from launch fiber 22. Sensor 10 includes a lid 82, a body 84, and an upper retaining mechanism 86 and a lower retaining mechanism 88. Upper and lower retaining mechanisms 86 and 88 retain launch fiber 22. In this embodiment, launch fiber 22 is mechanically decoupled from the sensing regions.

Lid 82 is suitably configured and formed of a material which resists bending due to pressure being acted upon it. In one exemplary embodiment, lid 82 is formed of silicon and is thick enough to inhibit any significant flexing. The body 84 is attached to an underside surface 83 of the lid 82 through a suitable attaching mechanism, such as, for example, an adhesive.

Aperture 20 is formed through the body 84. On the underside surface 83 of the lid 82 at a position contiguous with aperture 20, a first reflective layer 92 is provided. First reflective layer 92 is formed of a material which reflects substantially all light incident upon its surface, such as gold (Au). As with the lid 82, body 84 is configured and formed of a material which resists bending due to pressure being acted upon it. In one exemplary embodiment, the body 84 is formed of silicon and is thick enough to inhibit any significant flexing of the body 84.

Upper fiber retainer 86 includes a diaphragm 94 extending from an upper retaining base 96. As illustrated in FIG. 17, upper retaining base 96 includes a V-groove suitably configured to retain launch fiber 22. It should be appreciated that upper retaining base 96 may take any configuration capable of retaining launch fiber 22.

Diaphragm 94 is dimensioned and sized in area, shape and thickness to exhibit the necessary transfer function for pressure and temperature. In particular, diaphragm 94 is configured to be flexible in the presence of pressure being acted upon it. Diaphragm 94 is formed of temperature sensitive material 52, as described above. In an exemplary embodiment, upper fiber retainer 86, including the diaphragm 94, is formed of silicon.

Fiber 22 rests in and is further retained in lower retaining mechanism 88. Lower retaining mechanism 88 includes another V-groove, as illustrated in FIG. 16, which matches the V-groove of upper retaining mechanism 86. It should be appreciated, however, that any suitable configuration may be used to retain launch fiber 22 in the lower retaining mechanism 88.

Launch fiber 22 extends from a light source (not shown) to angled fiber end 98. Angled fiber end 98 is polished at an approximately 45° angle from the longitudinal axis of the fiber 22. Second reflective layer 93 is coated on polished angled fiber end 98. Second reflective layer 93 is formed of a material which is capable of reflecting substantially all light incident upon its surface, such as gold.

Next will be described the functioning of optical sensor 10. Initial light 36 from the light source propagates down launch fiber 22. Initial light 36 reaches second reflective layer 93 at angled fiber end 98 and is reflected approximately 90° to continue its transmission at an angle approximately perpendicular to the longitudinal axis of launch fiber 22.

The V-grooves are formed so that the distance D between the outer surface of the fiber 22 and diaphragm 94 is sufficiently small so that substantially no reflection of initial light transmission 36 occurs at the outer surface of the fiber 40. Instead, first reflected light 38 occurs at a lower surface 100 of diaphragm 94, and first reflected light 38 is reflected off of second reflective layer 93 and back up launch fiber 22 to the surface. Second reflected light portion 40 occurs at upper surface 102 of the diaphragm 94, and this reflected light also is reflected off of second reflective layer 93 and back up launch fiber 22. Finally, third reflection 44 occurs at the first reflective layer 92 on the underside surface of the lid 82, and that reflected light is also reflected off of second reflective layer 93 and back up launch fiber 22. Since first reflective layer 92 is formed of a material which reflects substantially all light becoming incident upon its surface, third reflection 44 contains substantially all the remaining light from the original light transmission 36 less the light already reflected in the first and second reflections 38, 40.

An alternative embodiment of FIGS. 15-17 will now be described. Instead of first reflective layer 92 on underside surface 83 of the lid 82, an anti-reflective coating may be positioned on an upper surface of the lid 12. In such an embodiment, fourth reflection 46 would not reflect all of the remaining light, but would instead reflect about the same percentage as the other reflections 38, 40, 44. An antireflective coating on the upper surface of the lid 12 inhibits an additional reflection that may interfere with the accurate demodulation of the desired interferometric signals.

As optical sensor 10 descends into a well, pressure causes the diaphragm 24 to flex, creating a change in distance "L" between the upper surface of diaphragm 94 and first reflective layer 92 on the underside surface 83 of the lid 82. As the pressure increases, the distance the light must travel between the second and third reflections 40, 44 is altered. The change in this distance can be used to calculate the pressure at any point below the surface.

As noted above, diaphragm 94 is formed of a material that exhibits a change in refractive index with changing temperature. The time differential between the return of the first and second reflections 38, 40 corresponds to a known temperature, such as, for example, standard temperature of 70° F. at the earth's surface. As sensor 10 descends from the surface, the refractive index of diaphragm 94 will change with the increasing temperature, thus altering the time differential between the first and second reflections 38, 40. The difference in the time differentials of the first and second reflections between the surface and at some depth below the surface can be equated with a temperature at that depth. Knowing the temperature at that depth will allow for the alteration of the pressure calculations to more accurately portray the pressure at that same depth.

Figure 18A:
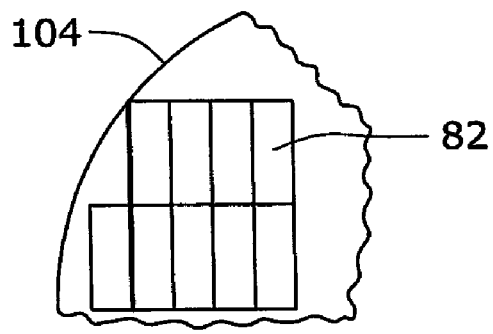
FIG. 18A illustrates a partial wafer including the lids of FIG. 15.
Figure 18B:
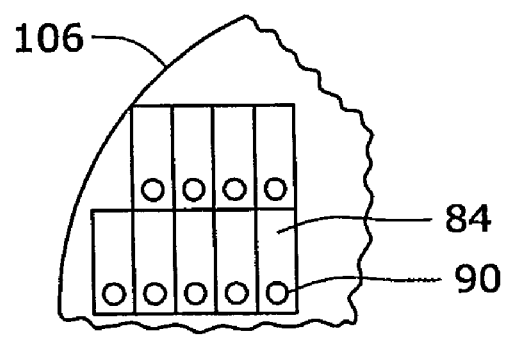
FIG. 18B illustrates a partial wafer including the bodies of FIG. 15.
Figure 18C:
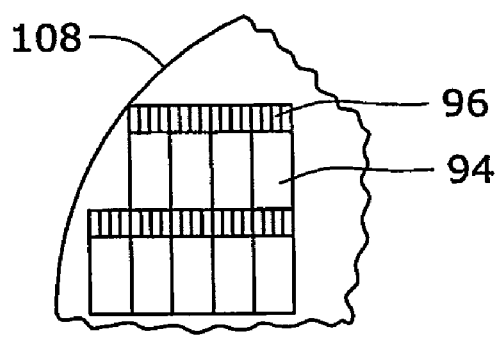
FIG. 18C illustrates a partial wafer including the upper retaining mechanisms of FIG. 15.

With reference to FIGS. 18A-C and 19, a method of assembling sensor 10 is illustrated. Major portions of sensor 10 may be formed entirely out of silicon in a standard wafer fabrication assembly and assembled with launch fiber 22 in a standard connector fashion, thus enabling mass production in a repeatable way with a high yield. As shown, a wafer 104 is formed with a plurality of lids 82 patterned thereupon (FIG. 18A). Another wafer 106 is formed with a plurality of bodies 84, each including an aperture 90, patterned thereupon (FIG. 18B). Another wafer 108 also is formed with a plurality of upper fiber retainers 86 patterned thereupon (FIG. 18C). The wafers 104, 106 and 108 are formed of a suitably crystalline material, such as, for example, silicon. It is preferred that each of the wafers 104, 106 and 108 is formed of the same crystalline material as the other wafers. It should be appreciated that the wafers 104, 106 and 108 and the lids 82, bodies 84, and upper fiber retainers 86 thereupon are only partially shown for ease of illustration.

Figure 19:
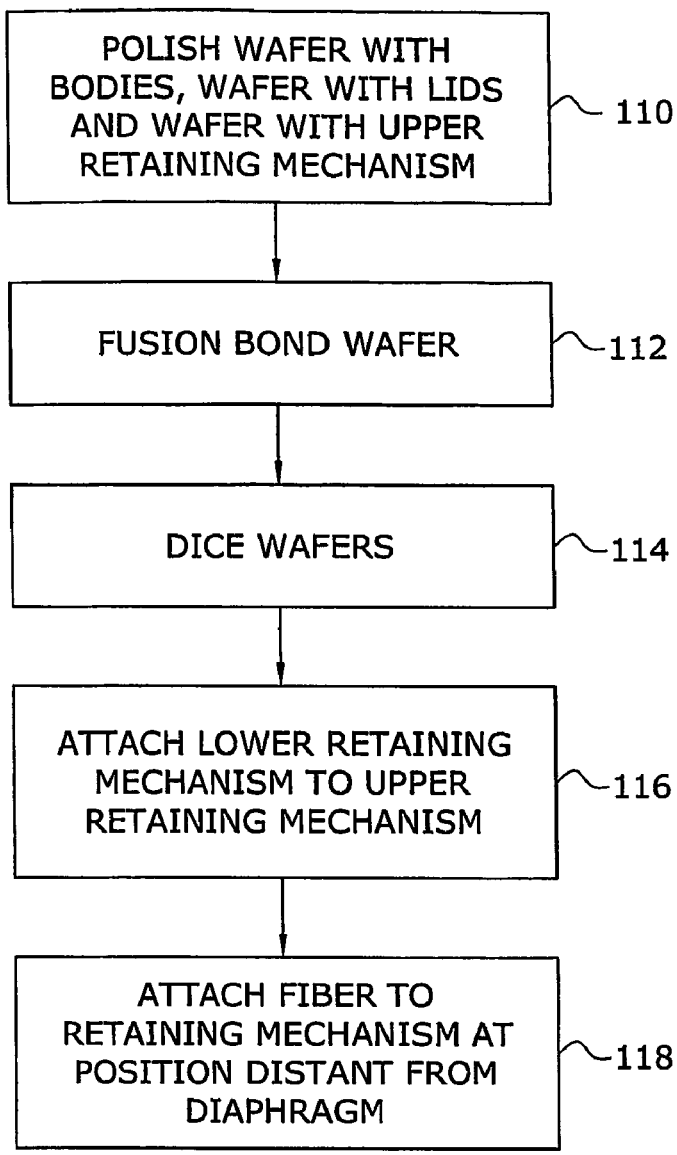
FIG. 19 illustrates a process for assembling the optical sensor of FIG. 15.

Referring to FIG. 19, at step 110, each of the wafers 104, 106 and 108 are polished down to the molecular level. A lapping/polishing machine, such as a chemical mechanical polisher, may be utilized to polish the wafers 104, 106 and 108. By polishing each wafer down to the molecular level, the wafers are rendered smooth at the molecular level.

At Step 112, the wafers 104, 106 and 108 are all aligned and fusion bonded together. To ensure proper measurements and minimal degradation of the measurement quality of the sensors 10 formed through this process, the alignment and fusion of the wafers 104, 106 and 108 preferably should be accomplished in a vacuum. This will create a vacuum in apertures 90 in the body 84. Because each of the wafers 104, 106 and 108 is smooth down to the molecular level, contact between them causes the wafers to fuse together. For the wafers formed of silicon, the fusion bonding is a silicon fusion bonding.

At Step 114, the wafers 104, 106 and 108 are diced into individual dies, each including a lid 82, a body 84, and an upper fiber retainer 86. At Step 116, lower retaining mechanism 88 is attached to upper retaining mechanism 86 for each of the now diced dies. A suitable attachment mechanism is solder glass. The attachment of upper retaining mechanism 86 to lower retaining mechanism 88 is removed a suitable distance from the diaphragm 94, thereby mechanically decoupling the mounting of launch fiber 22 from the sensing components of sensor 10.

At Step 118, launch fiber 22, with its angled end 98 already polished and coated with second reflective layer 93, is positioned within the V-grooves of the retaining mechanisms 86, 88 and mounted therein.

In this way, launch fiber 22 is attached to sensor 10 in such a way that it is mechanically decoupled from the measurement function of the sensor. Further, through the mass production of major components of sensors 10, the cost of such sensors may be decreased, making the use of such sensors 10 more economically feasible in lower producing wells. It should be appreciated that the lid 82, body 84 and upper fiber retainer 86 can be lengthened to provide additional stress isolation between the mounting and the sensing components of sensor 10.

Figure 20:
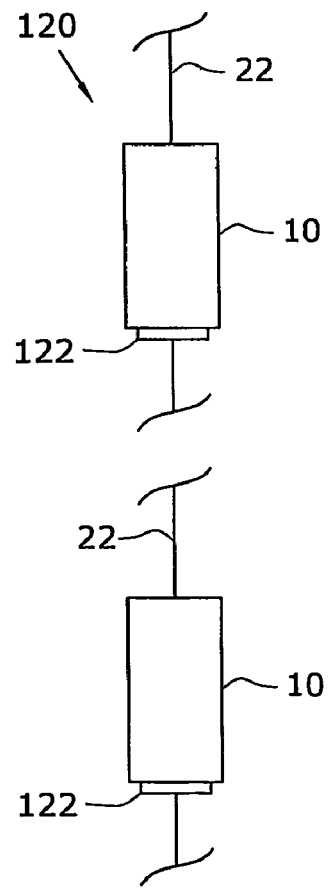
FIG. 20 illustrates schematically a fiber optic system incorporating the optical sensors of the present invention.

With reference to FIG. 20, a fiber optic sensor system 120 is described. The fiber optic sensing system 120 includes a plurality of optical sensors 10 mounted to launch fiber 22. A tap 122 can be included with each sensor 10 to redirect any unreflected light to the next sensor 10 along launch fiber 22. In this way, it is possible to string a plurality of sensors 10 along launch fiber 22 to make temperature and pressure measurements at various locations along the well bore.

An exemplary method of operating sensor 10 of the present invention is described below. Using co-located pressure and temperature sensor 10, pressure at a particular depth below the surface can be calculated through the measurement of the optical displacements resulting from a change in the physical distance between the first pair of reflection points when the index of refraction remains the same. Further, this pressure calculation can be modified to take into account a change in temperature experienced at that particular depth below the surface. The modification is accomplished by measuring the optical displacements resulting when the physical distance between the second pair of reflection points remains largely unchanged due to the pressure, but the index of refraction is altered.

Figure 21:
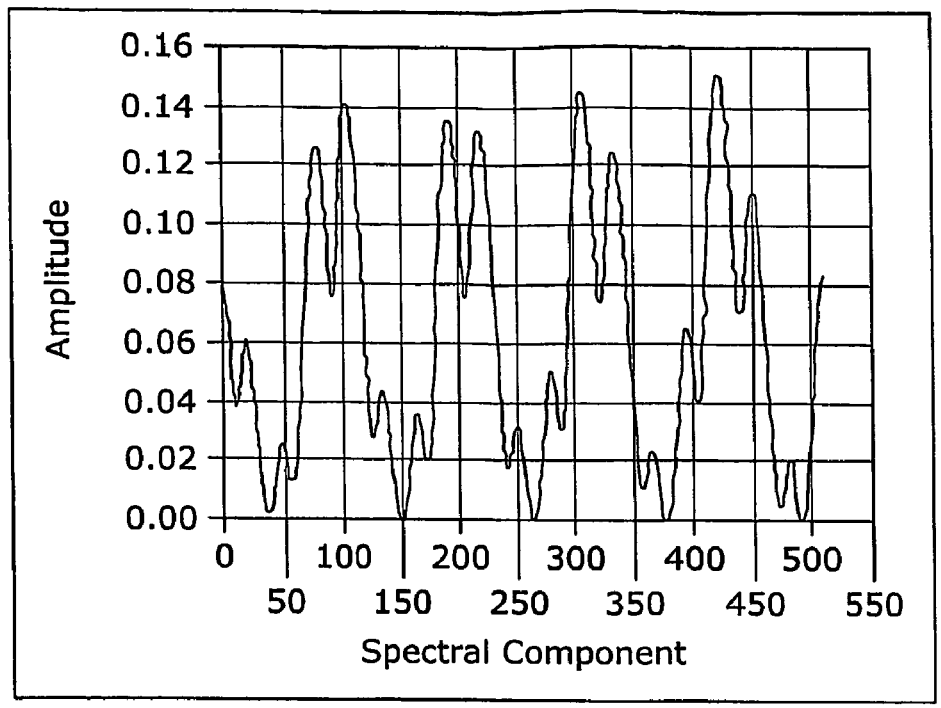
FIG. 21 is a graph indicating spectral data taken by a sensor of FIG. 1.

Optical sensor 10 provides sets of reflective surfaces, the optical path between which change with the application of pressure and temperature. Light reflected from sensor 10 interferes, and optically generates interferometric patterns/signals. An example of the interferometric spectrum is shown in FIG. 21. This interferometric spectrum is demodulated mathematically through known signal transformation techniques such as Fourier transform techniques or other mathematical processes. Alternately, the interferometric spectrum may be demodulated optically using known optical path-length matching techniques.

Figure 22:
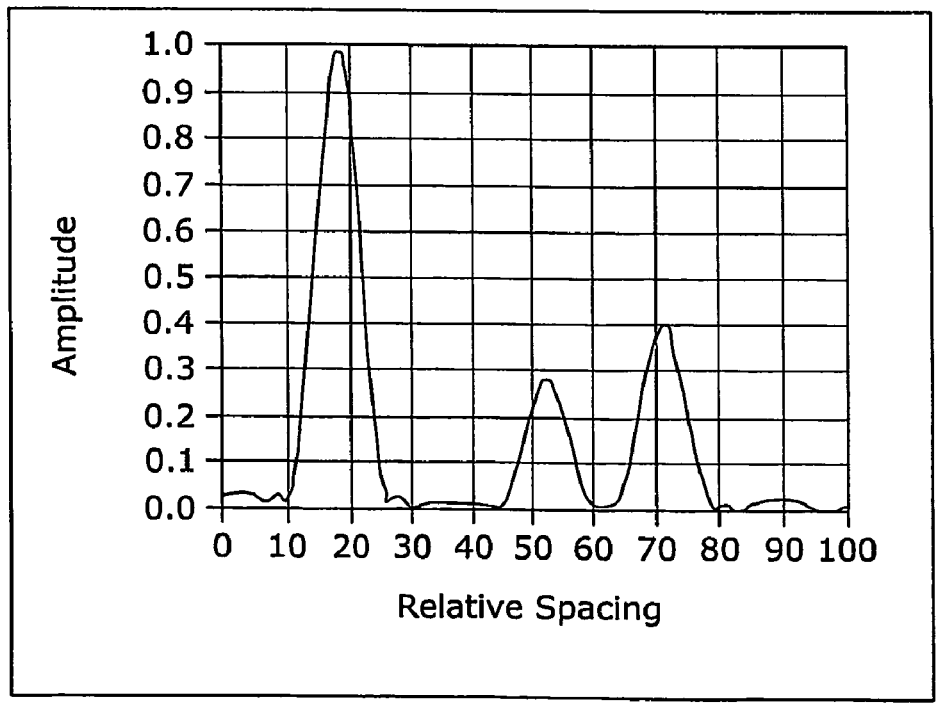
FIG. 22 is a graph of the spectral data of FIG. 10 converted by Fourier transform.

The demodulated spectrum is shown in FIG. 22. The tip of each peak is the approximate measured optical path length of each sensor signal. The peaks indicate the spacing locations of the reflective surfaces of optical sensor 10. As shown in FIG. 22, the locations of the reflective surfaces are at about 18, 53 and 71 on the horizontal axis.

Figure 23:
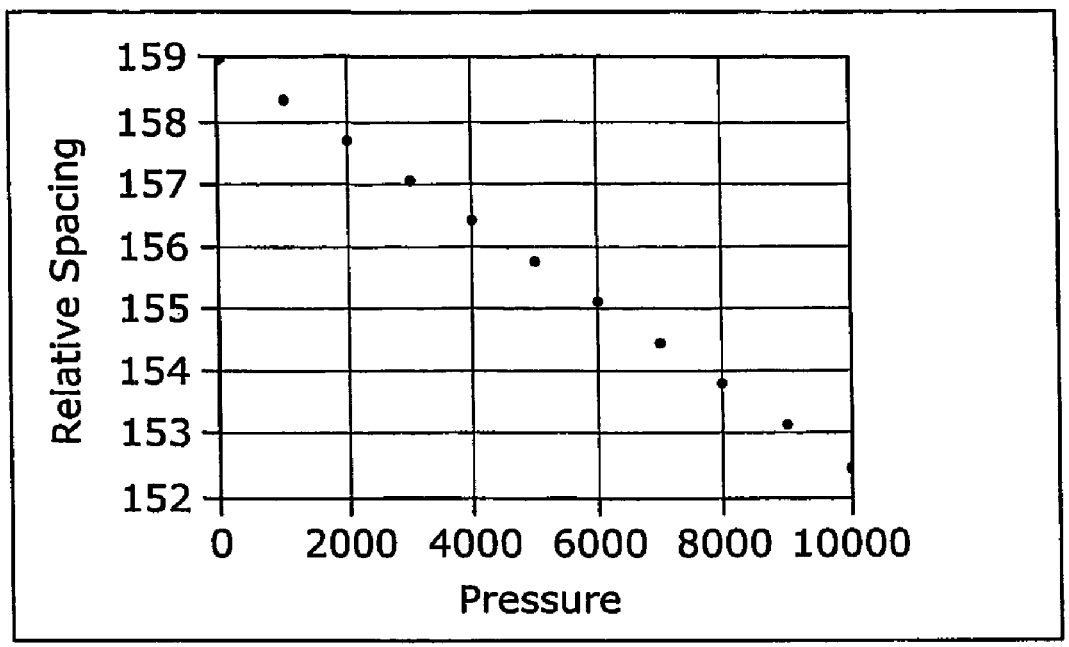
FIG. 23 is a graph of the spacing of reflective surfaces versus pressure.

The measured spacings are then converted to pressure and temperature measurements using a calibration of optical sensor 10 over pressure and temperature. A calibration of the sensor over pressure and temperature is conducted and subsequently the locations of the reflective surfaces can be converted to pressure and temperature. A plot of detected pressure versus spacing based on these peaks is illustrated in FIG. 23. Since the pressure gap measurement is dependent on temperature, this temperature dependence is preferably determined and accounted for in the pressure calculations as discussed below.

Figure 24:
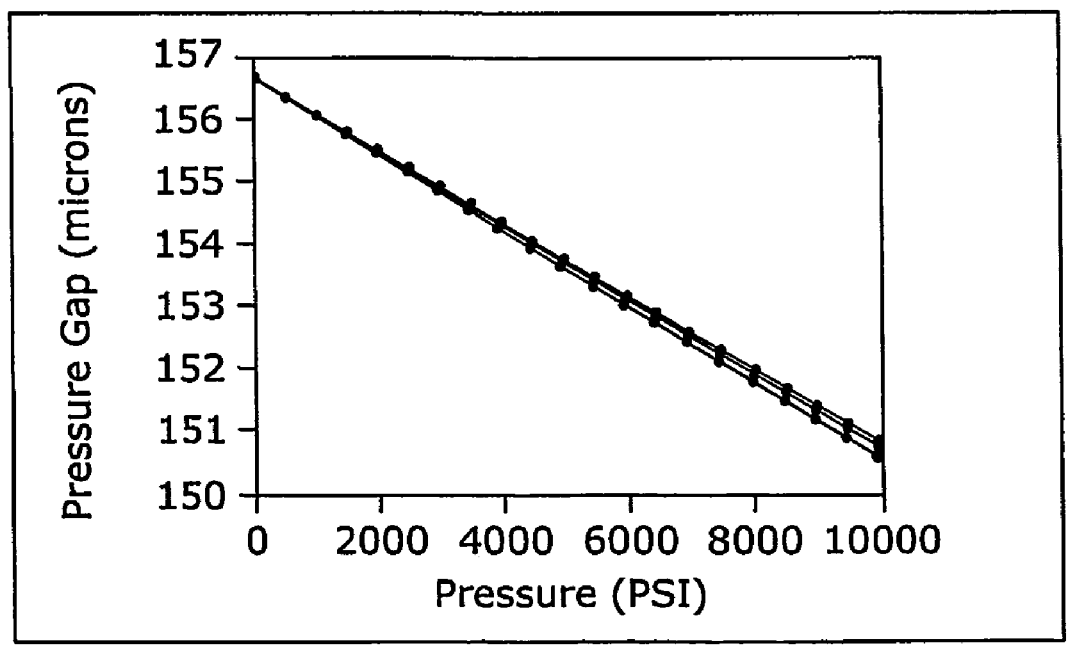
FIG. 24 is a graph of the pressure gap versus pressure at various temperatures.
Figure 25:
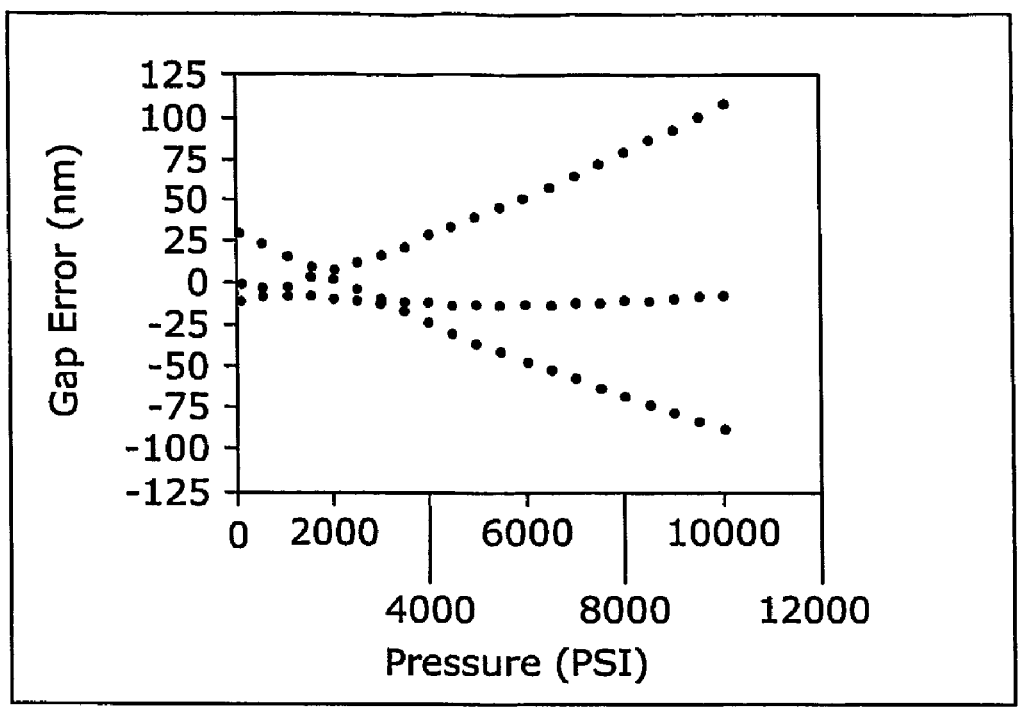
FIG. 25 is a graph of pressure error versus pressure for several temperatures.

Referring to FIG. 24, measured pressure gap 66 is plotted versus pressure for three different temperatures, e.g., 0° C., 75° C., 150° C. Any temperatures and any number of temperature curves can be used. As shown, the three plots for the three temperatures do not overlap but diverge, particularly at higher pressures. This represents a family of pressure curves as functions of pressure gap and temperature. The error in gap length is illustrated in FIG. 25. Gap error 68 resulting from the change in temperature is calculated from a best fit straight line of the data and plotted against pressure 62. A sensitivity of about 0.5 nm/psi yields an error of plus or minus 200 psi. Therefore, a plurality of temperature dependent pressure calibration curves are needed to correct for these gap errors, such as those shown in FIG. 24. Once the temperature at the location of the pressure measurement is determined, then the appropriate pressure calibration curve is selected. The selected pressure calibration curve is then used to determine the pressure associated with the measured pressure spacing. Alternatively, if the measured temperature does not match one of the curves, then two adjacent curves that bracket are chosen, and the pressure reading is obtained by interpolation between these curves.

Figure 26:
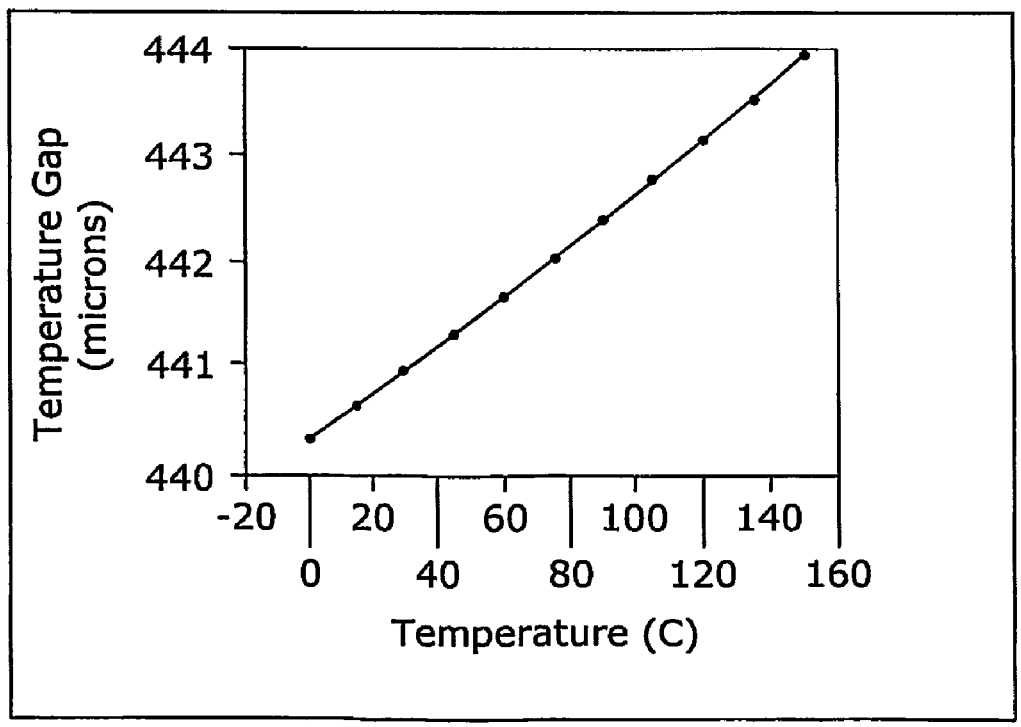
FIG. 26 is a graph of temperature gap versus temperature for a pressure independent temperature measurement.

Preferably, a pressure independent temperature measurement from optical sensor 10 is used. This temperature measurement can be carried out at the ground surfaces and at known temperature, e.g., by measuring the changes in optical length between surfaces 30 and 50 as shown in FIG. 3. FIG. 26 illustrates a suitable plot of measured temperature gap 70 versus temperature 72 for a pressure independent temperature measurement. In one non-limiting example, sensor 10 has a temperature range of 0-150° C., and a pressure range of 0-10,000 psi.

While the foregoing has described in detail exemplary embodiments of the invention, it should be readily understood that the invention is not limited to the disclosed embodiments. Rather the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

We claim:

1. An optical sensor comprising a launch waveguide and at least two sensing regions located proximate to each other
    wherein one of the sensing regions is a pressure sensing region having a first and a second reflecting surface, wherein the distance between the first and second reflecting surfaces changes in response to a change in pressure, and wherein a first reflected light and a second reflected light from said reflecting surfaces form an interferometric signal representative of a pressure at the location of the optical sensor, and wherein the reflected lights have substantially the same wavelengths as the original incident light,
    wherein the other sensing region is a temperature sensing region substantially insensitive to pressure, and
    wherein the launch waveguide is connected to a housing and when the housing is exposed to a pressure at a predetermined downhole location in an oil or gas well, and the exposure to the downhole pressure changes the dimensions of at least a portion of the housing to change the distance between the first and second reflecting surfaces, such that the pressure and temperature can be measured.

2. The optical sensor of claim 1, wherein the launch waveguide is operatively connected to the housing and projects light into the housing.

3. The optical sensor of claim 2, wherein the housing is defined by the launch waveguide and one of the following:
    a) a hollow tube and a distal member, wherein the tube is connected to the launch waveguide and the distal member wherein the hollow tube and the distal member form the housing,
    b) an end cap wherein the end cap forms the housing, or
    c) two half-cups wherein the two half-cups form the housing.

4. The optical sensor of claim 3, wherein the distal member is a reflective waveguide, a disk or another end cap.

5. The optical sensor of claim 1, wherein at least one of the two reflecting surfaces is coated with an optical coating.

6. The optical sensor of claim 1, wherein at least one of the two reflecting surfaces is modified.

7. The optical sensor of claim 6, wherein at least one of the two reflecting surfaces forms a lens.

8. The optical sensor of claim 1, wherein said housing comprises a partial vacuum.

9. The optical sensor of claim 1, wherein the temperature sensing region comprises a third reflecting surface.

10. The optical sensor of claim 9, wherein the second reflected light and a third reflected light from the third reflecting surface form an interferometric signal representative of a temperature at the location of the optical sensor.

11. The optical sensor of claim 9, wherein the temperature sensing region further comprises a fourth reflecting surface and wherein a third reflected light and a fourth reflected light from the third and fourth reflecting surfaces form an interferometric signal representative of a temperature at the location of the optical sensor.

12. The optical sensor of claim 11, wherein the first and second reflecting surfaces are connected to the third and fourth reflecting surfaces by an optical member.

13. The optical sensor of claim 1, wherein the temperature sensing region is spaced apart from the housing.

14. The optical sensor of claim 1, wherein the temperature sensitive region forms a part of the housing.

15. The optical sensor of claim 10, wherein the second and third reflecting surfaces define a diaphragm and wherein in response to pressure the diaphragm changes the distance between the first and second reflecting surfaces.

16. The optical sensor of claim 1, wherein the housing has a unitary construction and is defined by a tube fused to the launch waveguide and to a capillary tube.

17. The optical sensor of claim 16, wherein the tube and the capillary tube are made from materials having similar coefficient of thermal expansion.

18. The optical sensor of claim 17, wherein the length that the capillary tube extends inside the housing is substantially similar to the length of the housing to compensate for the thermal expansion on the distance between the first and second reflecting surface.

19. The optical sensor of claim 17, wherein the tube and capillary tube are made from fused silica.

20. The optical sensor of claim 19, wherein the temperature sensing region is disposed inside the capillary tube.

21. The optical sensor of claim 16, wherein the capillary tube further comprises a hollow portion to minimize reflected light.

22. The optical sensor of claim 16, wherein the distal end of the capillary tube is modified to minimize reflected light.

23. The optical sensor of claim 1, wherein the launch waveguide is located spaced apart from the housing and projects light into the housing.

24. The optical sensor of claim 23, wherein the distal end of the launch waveguide is angled so that light propagating through the launch waveguide is directed into the housing.

25. The optical sensor of claim 23, wherein light from the launch waveguide propagates through the temperature sensing region before propagating through the housing.

26. The optical sensor of claim 1, wherein the housing is sealed.

27. The optical sensor of claim 1, wherein at least a portion of the sensor is covered by a coating to reduce moisture or contaminant penetration.

28. The optical sensor of claim 27, wherein said coating comprises xylylene, carbon or titanium oxide.

* * * * *